United States Patent [19]

Niitsu

[11] Patent Number: 5,132,790
[45] Date of Patent: Jul. 21, 1992

[54] DETECTING CIRCUIT OF A VIDEO MOTION SIGNAL

[75] Inventor: Shigeo Niitsu, Tokyo, Japan
[73] Assignee: NEC Corporation, Tokyo, Japan
[21] Appl. No.: 675,750
[22] Filed: Mar. 27, 1991
[30] Foreign Application Priority Data Mar. 27, 1990 [JP] Japan .................................. 2-78072

[51] Int. Cl.⁵ .............................................. H04N 7/18
[52] U.S. Cl. ...................................... 358/105; 358/36
[58] Field of Search ................... 358/105, 31, 36, 133, 358/136, 140, 11

[56] References Cited

U.S. PATENT DOCUMENTS

| | | | |
|---|---|---|---|
| 4,616,254 | 10/1986 | Harwood et al. | 358/36 |
| 4,809,060 | 2/1989 | Saeki | 358/31 |
| 4,922,331 | 5/1990 | Ezaki | 358/31 |
| 4,924,305 | 5/1990 | Nakagawa et al. | 358/105 |
| 4,930,012 | 5/1990 | Fujita | 358/105 |
| 4,972,259 | 11/1990 | Motoe et al. | 358/36 |
| 5,032,914 | 7/1991 | Fujita | 358/105 |

Primary Examiner—John K. Peng
Assistant Examiner—Michael H. Lee
Attorney, Agent, or Firm—Helfgott & Karas

[57] ABSTRACT

In a detecting circuit of a video motion signal, luminance signal components of a video signal and a one-frame-delayed video signal of the video signal are respectively extracted by corresponding comb shaped filters, then the luminance signal component of the video signal is subtracted by that of the one-frame-delayed video signal to generate a luminance frame difference signal. If either it is detected that the video signal includes a color signal component by a color signal component detecting circuit, or it is detected that a luminance line difference signal has a difference component by a luminance vertical difference component detecting circuit, a signal component in the frequency band in which the color signal component thus detected by the color signal component detecting circuit is removed from the luminance frame difference signal by a filter circuit, so that the luminance frame difference signal includes no color signal component which may cause a dot crawling in a still video picture, without causing a cross color or a double picture.

9 Claims, 4 Drawing Sheets

DETECTING CIRCUIT OF A VIDEO MOTION SIGNAL

FIELD OF THE INVENTION

This invention relates to a detecting circuit of a video motion signal, and more particularly to, a detecting circuit of a video motion signal for detecting a motion of a video picture in a television set, a video cassette recorder, etc..

BACKGROUND OF THE INVENTION

A conventional detecting circuit of a video motion signal comprises a frame memory for storing a video signal to be supplied as a delayed video signal after a period as long as one frame, a difference detecting circuit which comprises a subtracter for subtracting the delayed video signal from an input video signal to generate a frame difference signal, and a low-pass filter for passing through a low frequency component of the difference signal to generate a luminance frame difference signal.

In operation, an input video signal is supplied to the detecting circuit as a video signal of the NTSC mode in which a sum signal of a luminance signal component and a color signal component and a difference signal thereof are supplied interleavingly in every scanning line of the video signals. The input video signal has been digitized by an A/D converter beforehand.

In the difference detecting circuit, a frame difference signal $D_j$ (j is defined as a frame number hereinafter) is defined as the following formula:

$$\begin{aligned} D_j &= IN_j - IN_{j-1} \\ &= (Y_j + C_j) - (Y_{j-1} - C_{j-1}) \\ &= (Y_j - Y_{j-1}) + (C_j + C_{j-1}) \\ &= \Delta Y + (C_j + C_{j-1}) \end{aligned}$$

where $IN_j$ corresponds to the input video signal of the frame number j, $IN_{j-1}$ corresponds to the delayed video signal supplied from the frame memory, $Y_j$ and $Y_{j-1}$ correspond to the luminance signal components, $C_j$ and $C_{j-1}$ correspond to the color signal components, and $\Delta Y$ corresponds to a luminance frame difference signal.

The luminance frame difference signal $\Delta Y$ has no value when a video picture which consists of one frame of video signals is in a still picture mode and has a value in a motion picture mode, on the other hand, the color signal component $(C_j + C_{j-1})$ has some value even in the still picture mode. Therefore, in order to extract the luminance frame difference signal $\Delta Y$, the frame difference signal $D_j$ is passed through the low-pass filter to extract a low frequency component thereof which corresponds to the luminance frame difference signal $\Delta Y$. Thus obtained $\Delta Y$ corresponds to a video montion signal by which it is detected whether a video picture is in motion or not.

According to the conventional detecting circuit of a video motion signal, however, there is a disadvantage in that separation of the luminance frame difference signal $\Delta Y$ and the color signal component $(C_j + C_{j-1})$ cannot be carried out perfectly by using only the low-pass filter, because the color signal component $(C_j + C_{j-1})$ has a broad distribution which extends to low frequency bands when color phases of the color signal changes largely or the color signal has an early rising distribution as like that made by computer graphic technics, so that the color signal component is included into the output signal of the low-pass filter.

As a result, the detecting circuit detects a signal of the part of the color signal component as a luminance frame differnece signal even in a still picture mode, so that the so called dot crawling may occur in the still picture.

On the other hand, if a low-pass filter having a narrow band characteristic to cut off the color signal component is adopted, the detecting circuit cannot detect the luminance frame difference signal when a value of the luminance signal changes quickly, so that a moving picture may be recognized as a still picture.

As a result, harmful phenomenons such as the cross color, the double pictures, etc. may occur in the still picture.

SUMMARY OF THE INVENTION

Accordingly, it is an object of the invention to provide a detecting circuit of a video motion signal which can detect a luminance frame difference signal which does not include the color signal component to prevent the dot crawling of the still picture without causing the cross color and the double pictures in a still picture.

According to a feature of the invention, a detecting circuit of a video motion signal comprises:

first means for extracting a luminance signal component from an input video signal;

means for storing the input video signal for a period corresponding to one frame and supplying the input video signal as a delayed signal;

second means for extracting a luminance signal component of the delayed signal supplied from the storing means;

means for substracting the output signal of the second extracting means from the output signal of the first filter to generate a luminance frame difference signal;

means for generating a color signal component detecting signal, the color signal component detecting signal becoming active when the input video signal includes the color signal component;

means for generating a luminance vertical difference component detecting signal, the luminance vertical difference component detecting signal becoming active when the luminance difference signal between two adjacent scanning lines includes a difference component;

means for generating a control signal, the control signal becoming active when either of the color signal detecting signal and the luminance vertical difference component detecting signal becomes active; and means for removing the color signal component from the luminance frame difference signal when the control signal is active.

BRIEF DESCRIPTION OF THE DRAWINGS

The invention will be explained in more detail in conjunction with appended drawings wherein.

DESCRIPTION OF THE PREFERRED EMBODIMENTS

Before describing a detecting circuit of a video motion signal according to the invention, the conventional detecting circuit of a video motion signal described before will be explained in conjunction with FIGS. 1 and 2.

Figure 1:
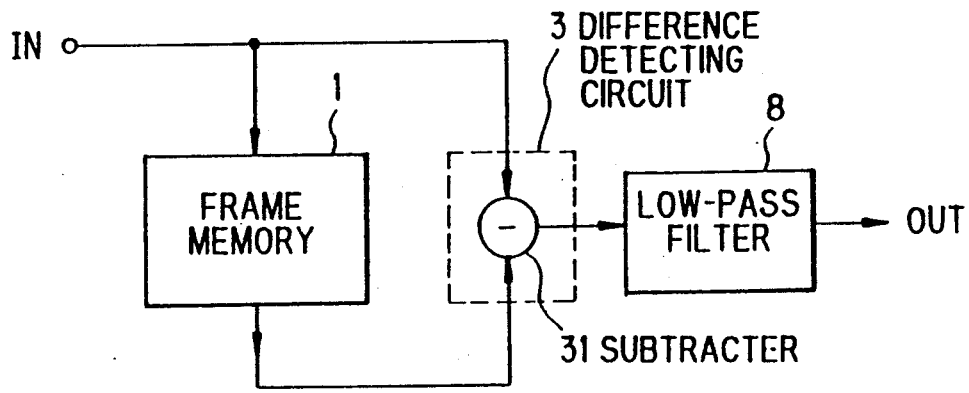
FIG. 1 is a block diagram of the conventional detecting circuit of a video motion signal.

FIG. 1 is a block diagram of the conventional detecting circuit of a video motion signal.

The conventional detecting circuit of a video motion signal comprises a frame memory 1, a difference detecting circuit 3, and a low-pass filter 8.

In operation, the input video signal IN is supplied to the detecting circuit, and is stored in the frame memory 1 and supplied therefrom to the difference detecting circuit 3 as a delayed video signal after a period as much as one frame, as described before. In the difference detecting circuit 3, a frame difference signal $D_j = \Delta Y + (C_j + C_{j-1})$ is generated by subtracting the delayed video signal from the input video signal IN.

The frame difference signal $D_j$ is passed through the low-pass filter 8 to extract a low frequency component thereof which corresponds to the luminance frame difference signal $\Delta Y$ to be supplied to an external circuit as an output signal OUT.

Figure 2:
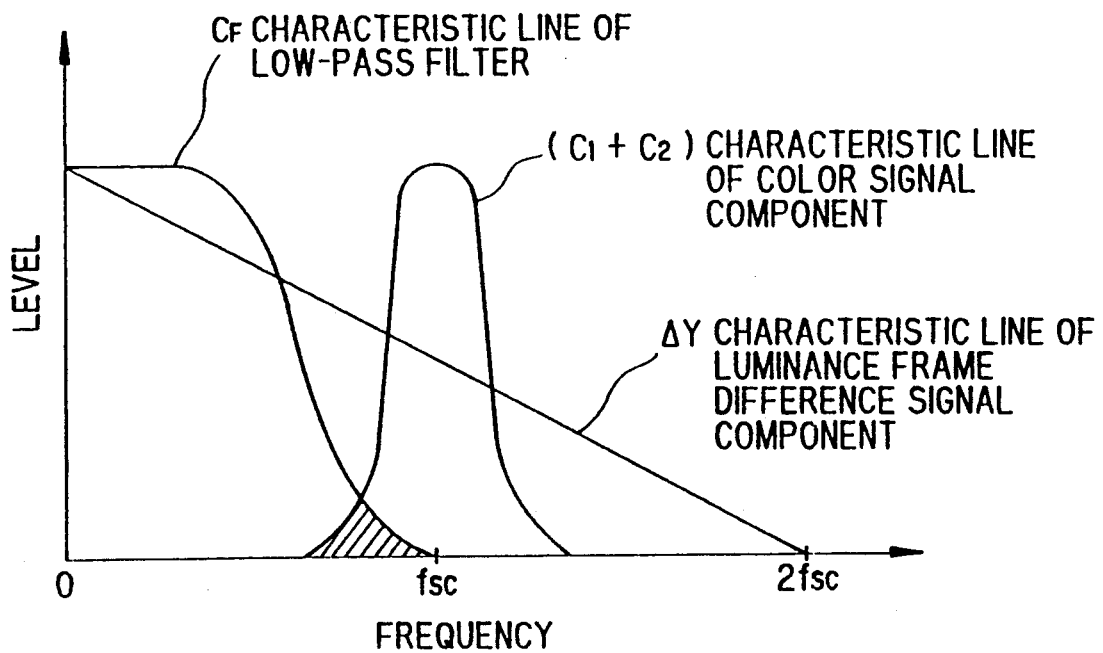
FIG. 2 is a diagram explaining the frequency characteristic of the conventional detecting circuit of a video motion signal.

FIG. 2 is a diagram explaining the frequency characteristic of the conventional detecting circuit of a video motion signal.

The color signal component $(C_1 + C_2)$ has a characteristic line having a level peak at a frequency $f_{SC1}$ that is 3.58 MHz, and extending to lower and upper frequency bands, where j is 1 in the above equation. On the other hand, the luminance difference signal $\Delta Y$ has a linear characteristic line whose level becomes high as the frequency becomes low, and the characteristic line extends to the higher frequency band approximately equal to $2f_{sc}$. The low pass filter 8 has a characteristic line $C_F$ having a broad low frequency pass-band.

As shown in FIG. 2, the lower frequency component of the luminance frame difference signal $\Delta Y$ can be extracted by passing through the low-pass filter 8, however, the lower frequency part of the color signal component also passes through the low-pass filter 8 (corresponding to the area indicated by the obliqued lines in FIG. 2), so that the output signal OUT of the low-pass filter 8 includes the lower frequency part of the color signal component $(C_1 + C_2)$.

Figure 3A:
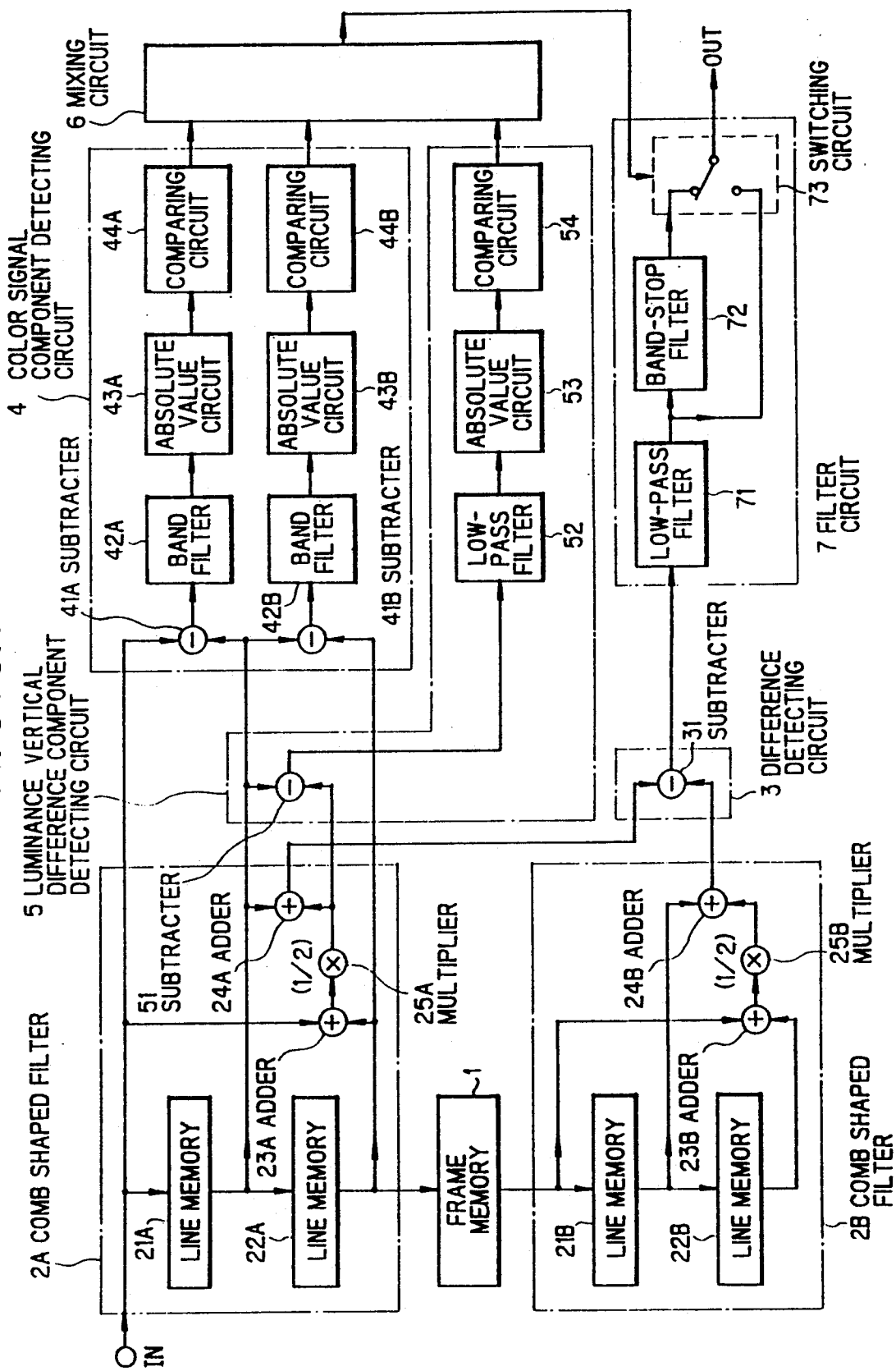
FIG. 3A is a block diagram of a detecting circuit of a video motion signal in a first preferred embodiment according to the invention.

Next, FIG. 3A is a block diagram of a detecting circuit of a video motion signal in a first preferred embodiment according to the invention.

The detecting circuit of a video motion signal comprises comb shaped filters 2A and 2B, a frame memory 1, a difference detecting circuit 3, a color signal component detecting circuit 4, a luminance vertical difference component detecting circuit 5, a mixing circuit 6, and a filter circuit 7.

The comb shaped filter 2A comprises line memories 21A and 22A each of which stores the input video signal IN supplied thereto to be supplied to a next step circuit after a period equal to one scanning line, adders 23A and 24A, and a multiplier 25A. The comb shaped filter 2A extracts a luminance signal component of the input video signal IN by using the correlation between three scanning lines.

The frame memory 1 stores the input video signal IN which is supplied thereto through the line memories 21A and 22A to be supplied to the comb shaped filter 2B after a period equal to one frame (equal to 525 scanning lines) as a one-frame-delayed video signal.

The comb shaped filter 2B comprises line memories 21B and 22B, adders 23B and 24B, and a multiplier 25B. The comb shaped filter 2B extracts a luminance signal component of the one-frame-delayed video signal supplied from the frame memory 1.

The difference detecting circuit 3 comprises a subtracter 31. The difference detecting circuit 3 subtracts an output signal of the comb shaped filter 2B from the output signal of the comb shaped filter 2A to generate a luminance frame difference signal.

The color signal component detecting circuit 4 comprises subtracters 41A and 41B, band filters 42A and 42B, absolute value circuits 43A and 43B, and comparing circuits 44A and 44B. The color signal component detecting circuit 4 generates a color signal component detecting signal which becomes active when the input video signal IN includes a color signal component.

The luminance vertical difference component detecting circuit 5 comprises a subtracter 51, a low-pass filter 52, an absolute value circuit 53, and a comparing circuit 54. The luminance vertical difference component detecting circuit 5 generates a luminance vertical difference component detecting signal which becomes active when a luminance difference signal between two adjacent scanning lines includes a luminance difference component (in other word, when there is a vertical edge of the luminance).

The mixing circuit 6 generates a signal which becomes active when either the color signal detecting signal or the luminance vertical difference component detecting signal becomes active.

The filter circuit 7 comprises a low-pass filter 71, a band-stop filter 72, and a switching circuit 73. In the filter circuit 7, the band-stop filter 72 is connected in a line of the filter circuit 7 if the signal supplied from the mixing circuit 6 is active, and disconnected of the signal is not active.

Figure 3B:
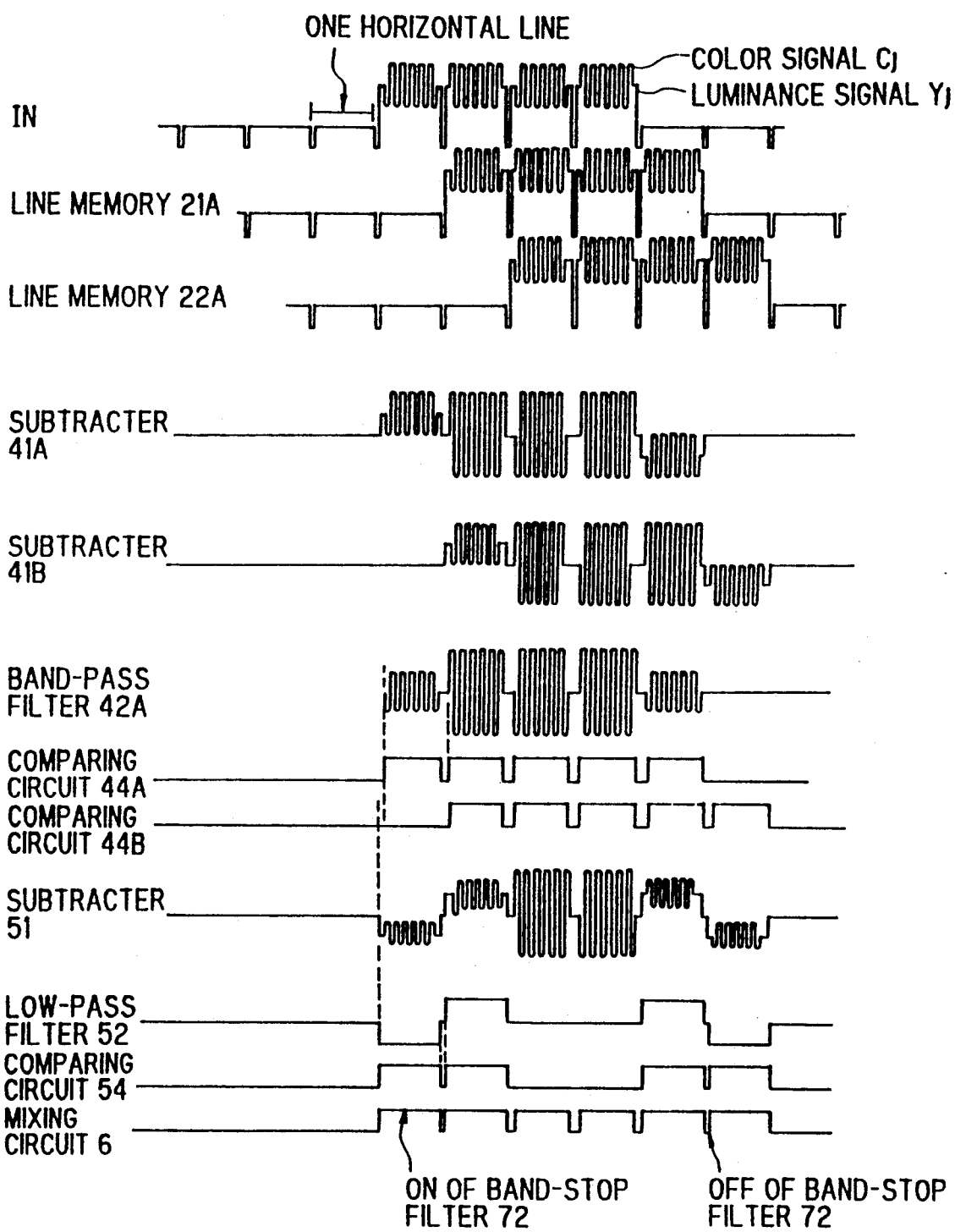
FIG. 3B is an explanatory diagram showing waveforms in the circuit in the first preferred embodiment.

FIG. 3B shows waveforms of the input video signal IN and output signals of the circuitry components in FIG. 3A.

In operation, the input video signal including the luminance and color signals $Y_j$ and $C_j$ is stored in the line memories 21A and 21B, the output signals of which have a time difference of one horizontal line therebetween as shown therein. The color signal $C_j$ is out of phase between adjacent horizontal lines as clearly understood from the illustrated waveforms. The input video signal IN and the output signals of the line memories 21A and 21B are subjected to subtracting calculation in the substracters 41A and 41B, so that output signals of the substracters 41A and 41B having illustrated waveforms are obtained, and are passed through the band-pass filters 42A and 42B.

An output signal of the band-pass filter 42A is only shown therein. The output signals of the band-pass filters 42A and 42B are supplied through the absolute value circuits 43A and 43B to the comparing circuits 44A and 44B, from which logic output signals are obtained as shown therein. On the other hand, the input video signal IN and the output signal of the line memory 22A are added by the adder 23A, and the added signal is multiplied in the multiplier by "½". Then, the multiplied output signal is supplied to the subtracter 51, in which it is subtracted from the output signal of the line memory 21A. The output signal of the subtracter 51 is illustrated therein, and is supplied to the low-pass filter 52, an output signal of which is illustrated therein, and is supplied through the absolute value circuit 53 to the comparing circuit 54. A logic output signal is obtained from the comparing circuit 54 as shown therein. The three logic output signals of the comparing circuit 44A, 44B and 54 are mixed in the mixing circuit 6 to provide a control signal which is an output signal of the mixing circuit 6 as shown at the lowest position of FIG. 3B. Thus, when the control signal is high, the switching circuit 73 is turned on to connect the band-stop filter 72 in serial to the low-pass filter 71, and when the control signal is low, the switching circuit is turned on to be connected directly to the output terminal of the low-pass filter 71. On the other hand, the one frame delayed video signal is supplied by the frame memory 1, and the luminance signal $Y_{j-1}$ is extracted from the one-frame-delayed video signal by the comb shaped filter 2B. Then, the luminance frame difference signal $\Delta Y$ is generated by subtracting the luminance signal $Y_{j-1}$ (supplied from the adder 24B) of the one-frame-delayed video signal from the luminance signal $Y_j$ (supplied from the adder 24A) of the input video signal IN by the subtracter 31 in the difference detecting circuit 3.

The luminance frame difference signal $\Delta Y$ thus obtained includes no component of the color signal if there is a correlation between the two signals respectively supplied to the comb shaped filters 2A and 2B, however, the luminance frame difference signal $\Delta Y$ includes a component of the color signal if there is no correlation between the two signals, so that color leakage occurs. Therefore, the component of the color signal must be removed from the luminance frame difference signal $\Delta Y$ to obtain a pure component of a luminance frame difference signal, however, if the components of signals having a frequency of 3.58 MHz and adjacent frequencies are removed from the luminance frame difference signal $\Delta Y$ at the color signal removing stage as explained in FIG. 2, a fast change of the luminance signal which corresponds to a fast motion of a video picture cannot be detected.

In this preferred embodiment, the video signal including the color signal component or the luminance signals in which there is no correlation between the adjacent scanning lines is detected by the color signal component detecting circuit 4 and the luminance vertical difference component detecting circuit 5 as shown by the signals of the comparing circuits 44A, 44B and 54 in FIG. 3B. Then, the color signal component is removed from the luminance frame difference signal $\Delta Y$ by the filter circuit 7, when the luminance frame difference signal $\Delta Y$ passes through the band-stop filter 72 which is connected serially to the low-pass filter 71 by the switching circuit 73 which is controlled to be turned by the control signal supplied from the mixing circuit 6 as shown in FIG. 3B. Then, the luminance frame difference signal $\Delta Y$ is supplied to an external circuit as an output signal OUT. If the control signal from the mixing circuit 6 is not active (low), then the band-stop filter 72 is not inserted into the line and the luminance frame difference signal $\Delta Y$ which only passes through the low-pass filter 71 is supplied directly to an external circuit.

Figure 4:
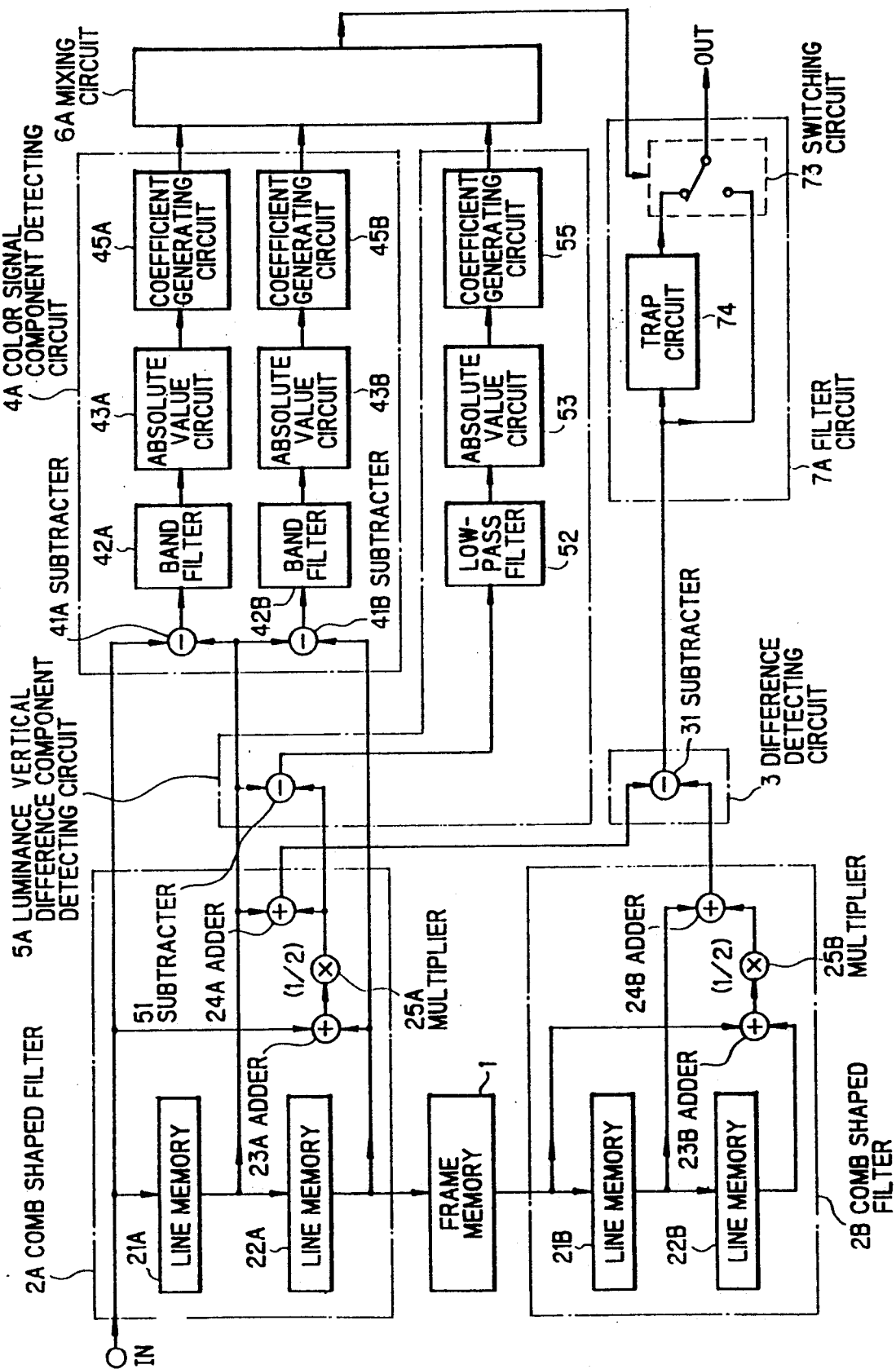
FIG. 4 is a block diagram of a detecting circuit of a video motion signal in a second preferred embodiment according to the invention.

Next, FIG. 4 is a block diagram of a detecting circuit of a video motion signal in a second preferred embodiment according to the invention.

The structure is the same as that of the detecting circuit of a video motion signal in FIG. 3A, except that the filter circuit 7 is replaced by a filter circuit 7A which comprises a trap circuit 74 and a switching circuit 73, and that the comparing circuits 44A, 44B and 54 in the color signal component detecting circuit 4 and the luminance vertical difference component detecting circuit 5 are replaced by coefficient generating circuits 45A, 45B and 55, respectively.

In the detecting circuit of a video motion signal in this embodiment, output signals from absolute value circuits 43A, 43B and 53 are modulated to have plural values, so that the mixing rate of these signals supplied to the mixing circuit 6A is able to be adjusted finely. As a result, a more smooth luminance motion signal can be extracted from the input video signal.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. A detecting circuit of a video motion signal, comprising:
    first means for extracting a luminance signal component from an input video signal;
    means for storing said input video signal for a period corresponding to one frame and supplying said input video signal as a delayed signal;
    second means connected to said storing means, for extracting a luminance signal component of said delayed signal supplied from said storing means;
    means connected to said first and second means, for subtracting an output signal of said second extracting means from an output signal of said first extracting means to generate a luminance frame difference signal;
    means receiving said input video signal, for generating a color signal component detecting signal, said color signal component detecting signal becoming active when said input video signal includes a color signal component;
    means connected to said first extracting means, for generating a luminance vertical difference component detecting signal, said luminance vertical difference component detecting signal becoming active when a luminance difference signal between two adjacent scanning lines includes a difference component;
    means connected to said means for generating a luminance vertical difference detecting signal and to means for generating said color signal component detecting signal, for generating a control signal, said control signal becoming active when either of said color signal component detecting signal and said luminance vertical difference component detecting signal becomes active; and
    means connected to said substracting means and to said means for generating said control signal, for removing said color signal component from said luminance frame difference signal when said control signal is active.

2. A detecting circuit of a video motion signal, according to claim 1, wherein:

each of said first and second extracting means is a comb shaped filter which comprises first and second line memories each of which stores the input video signal supplied thereto to be supplied to a next step circuit after a period equal to one scanning line, first and second adders each connected to a respective line memory, and a multiplier connected to said first and second adders, wherein each of said first and second comb shaped filters extracts said luminance signal component of said input video signal by using a correlation between three lines of one frame.

3. A detecting circuit of a video motion signal, according to claim 1, wherein:

said means for generating a luminance vertical difference component detecting signal comprises a subtracter connected to said first extracting means, a low-pass filter connected to said subtracter, an absolute value circuit connected to said low-pass filter, and a comparing circuit connected to said absolute value circuit.

4. A detecting circuit of a video motion signal, according to claim 1, wherein:

said means for removing said color signal component from said luminance frame difference signal is a filter circuit including a low-pass filter, a band-stop filter, and a switching circuit operated such that said band-stop filter becomes connected in said filter circuit when said control signal is active, and becomes disconnected in said filter circuit when said control signal is not active.

5. A detecting circuit of a video motion signal, according to claim 1, wherein:

said means for removing said color signal component from said luminance frame difference signal is a filter circuit including a trap circuit and a switching circuit operated such that said trap circuit becomes connected in said filter circuit when the control signal is active, and becomes disconnected in said filter circuit when said control signal is not active;

said means for generating a color signal component detecting signal comprises first and second subtracters, first and second band filters each connected to a respective subtracter, first and second absolute value circuits each connected to a respective band filter, and first and second coefficient generating circuits each connected to a respective absolute value circuit; and said means for generating a luminance vertical difference component detecting signal comprises a third subtracter connected to said first and second subtracters, a low-pass filter connected to said third subtracter, a third absolute value circuit connected to said low-pass filter, and a coefficient generating circuit connected to said third absolute value circuit;

wherein output signals from said first, second and third absolute value circuits are modulated to have plural values so that a mixing rate of said output signals supplied to means for generating a control signal is able to be adjusted finely.

6. A detecting circuit of a video motion signal, comprising:

first means for extracting a luminance signal component from an input video signal;

means for storing said input video signal for a period corresponding to one frame and supplying said input video signal as a delayed signal;

second means for extracting a luminance signal component of said delayed signal supplied from said storing means;

means for subtracting an output signal of said second extracting means from an output signal of said first extracting means to generate a luminance frame difference signal;

means receiving said input video signal, for generating a color signal component detecting signal, said color signal component detecting signal becoming active when said input video signal includes a color signal component;

means connected to said first extracting means, for generating a luminance vertical difference component detecting signal, said luminance vertical difference component detecting signal becoming active when a luminance difference signal between two adjacent scanning lines includes a difference component;

means connected to said means for generating a luminance vertical difference detecting signal and to means for generating a color signal component detecting signal, for generating a control signal, said control signal becoming active when either of said color signal component detecting signal and said luminance vertical difference component detecting signal becomes active; and means connected to said substracting means and to said means for generating said control signal, for removing said color signal component from said luminance frame difference signal when said control signal is active, said means for generating a color signal component detecting signal including first and second subtracters, first and second band filters each connected to a respective one of said first and second subtracters, first and second absolute value circuits each connected to a respective band filter, and first and second comparing circuits each connected to a respective absolute value circuit.

7. A detecting circuit of a video motion signal according to claim 6, wherein:

said means for generating a luminance vertical difference component detecting signal comprises a subtracter connected to said first extracting means, a low-pass filter connected to said subtracter, an absolute value circuit connected to said low-pass filter, and a comparing circuit connected to said absolute value circuit.

8. A detecting circuit of a video motion signal, according to claim 6, wherein:

said means for removing said color signal component from said luminance frame difference signal is a filter circuit including a low-pass filter, a band-stop filter, and a switching circuit operated such that said band-stop filter becomes connected in said filter circuit when said control signal is active, and becomes disconnected in said filter circuit when said control signal is not active.

9. A detecting circuit of a video motion signal, according to claim 6, wherein:

said means for removing said color signal component from said luminance frame difference signal is a filter circuit including a trap circuit and a switching circuit operated such that said trap circuit becomes connected in said filter circuit when the control signal is active, and becomes disconnected in said filter circuit when said control signal is not active;

said means for generating a color signal component detecting signal comprises first and second subtracters, first and second band filters each connected to a respective subtractor, first and second absolute value circuits each connected to a respective band filter, and first and second coefficient generating circuits each connected to a respective absolute value circuit; and said means for generating a luminance vertical difference component detecting signal comprises a third subtracter connected to said first and second subtracters, a low-pass filter connected to said third subtracter, a third absolute value circuit connected to said low-pass filter, and a coefficient generating circuit connected to said third absolute value circuit, wherein output signals from said first, second and third absolute value circuits are modulated to have plural values so that a mixing rate of said output signals supplied to said means for generating a control signal is able to be adjusted finely.

* * * * *